United States Patent [19]

Fiori

[11] Patent Number: 5,963,644
[45] Date of Patent: Oct. 5, 1999

[54] PROCESS AND DEVICE FOR MAKING SECURE A TELEPHONE LINK CONNECTING TWO SUBSCRIBER SETS

[75] Inventor: Costantino Fiori, Echirolles, France

[73] Assignee: France Telecom, France

[21] Appl. No.: 08/876,423

[22] Filed: Jun. 16, 1997

[30] Foreign Application Priority Data

Jun. 14, 1996 [FR] France .................................. 96 07449

[51] Int. Cl.[6] .............................. H04L 9/00; H04L 9/06; H04L 9/30
[52] U.S. Cl. .................................. 380/9; 380/21; 380/28; 380/29; 380/30; 380/46; 380/49
[58] Field of Search .................................. 380/9, 21, 28, 380/44, 45, 46, 47, 48, 49, 50, 59, 29, 30

[56] References Cited

U.S. PATENT DOCUMENTS 4,182,933  1/1980  Rosenblum ............................... 380/21
5,278,907  1/1994  Snyder et al. ............................ 380/48

OTHER PUBLICATIONS

IBM Technical Disclosure Bulletin, vol. 34 No. 1, Jun. 1991, New York, US pp. 331–338, XP000210235 Anonymous: "Method of Providing Encryption/Decryption for integrated Services Digital Network Telecommunications."

International Switching Symposium 1987: 'Innovations in Switching Technology'. Proceedings (Cat. No. 87CH2431–5), Phoenix, AX, USA, Mar. 15–20, 1987, New York, NY, USA, IEE, USA, pp. 863–869 vol. 4 XP0002017713 O'Higgins B et al: "Encryption and ISDN–a natural fit".

ICASSP–94. 1994 IEEE International Conference on Acoustics, Speech and Signal Processing (Cat. No. 94CH3387–8), Proceedings of ICASSP '94. IEEE International Conference on Acoustics, Speech and Signal Processing, Adelaide, Sa Australia, 19–22 Apr. 1, ISBN 0–7803–1775–0, 1994, New York, NY, USA, IEEE, USA, pp. II/425–8 vol. 2, XP00528508 diez–del–rio 1 et al: "Secure speech and data communication over the public switching telephone network".

*Primary Examiner*—Bernarr E. Gregory
*Attorney, Agent, or Firm*—Fulbright & Jaworski L.L.P.

[57] ABSTRACT

A telephone link comprises two network terminals to which two subscriber sets are respectively connected, two subscriber lines respectively linking the two network terminals to two line terminals respectively located at two local switching centers mutually linked by a switched telephone network, the network terminal and the line terminal of at least one of the subscriber lines being respectively equipped with one network encryption/decryption means and with one line encryption/decryption means wherein information exchanged between the two subscriber sets is encrypted, at least on one of the two subscriber lines which is connected to the respective network and line encryption/decryption means, on the basis of at least one encryption key generated by the network encryption/decryption means or by the line encryption/decryption means, and varying temporally in pseudo-random fashion by the network encryption/decryption means or by the line encryption/decryption means, the information exchanged between the two subscriber sets being transmitted in clear at least between each network terminal and the corresponding subscriber set.

12 Claims, 5 Drawing Sheets

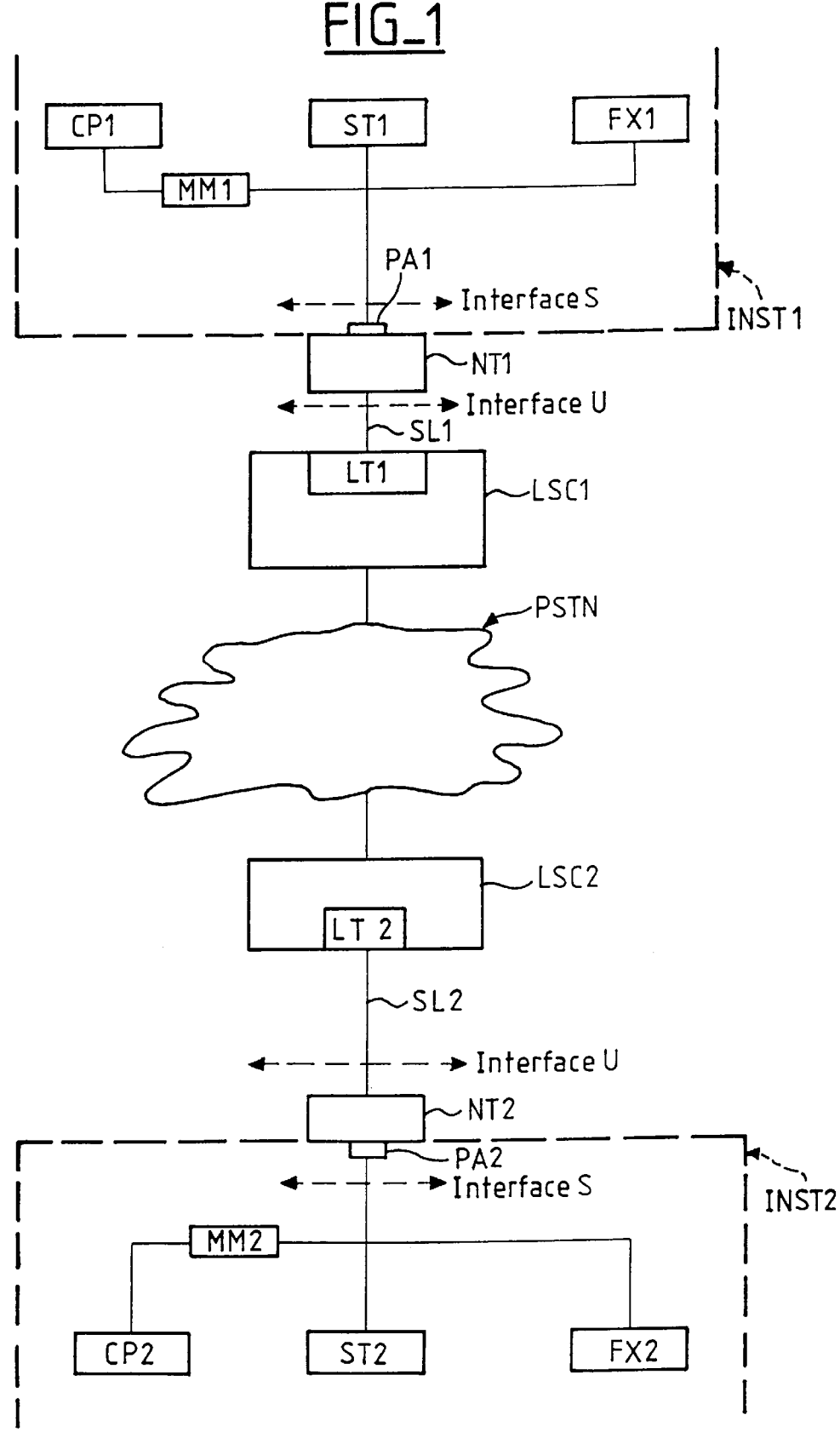

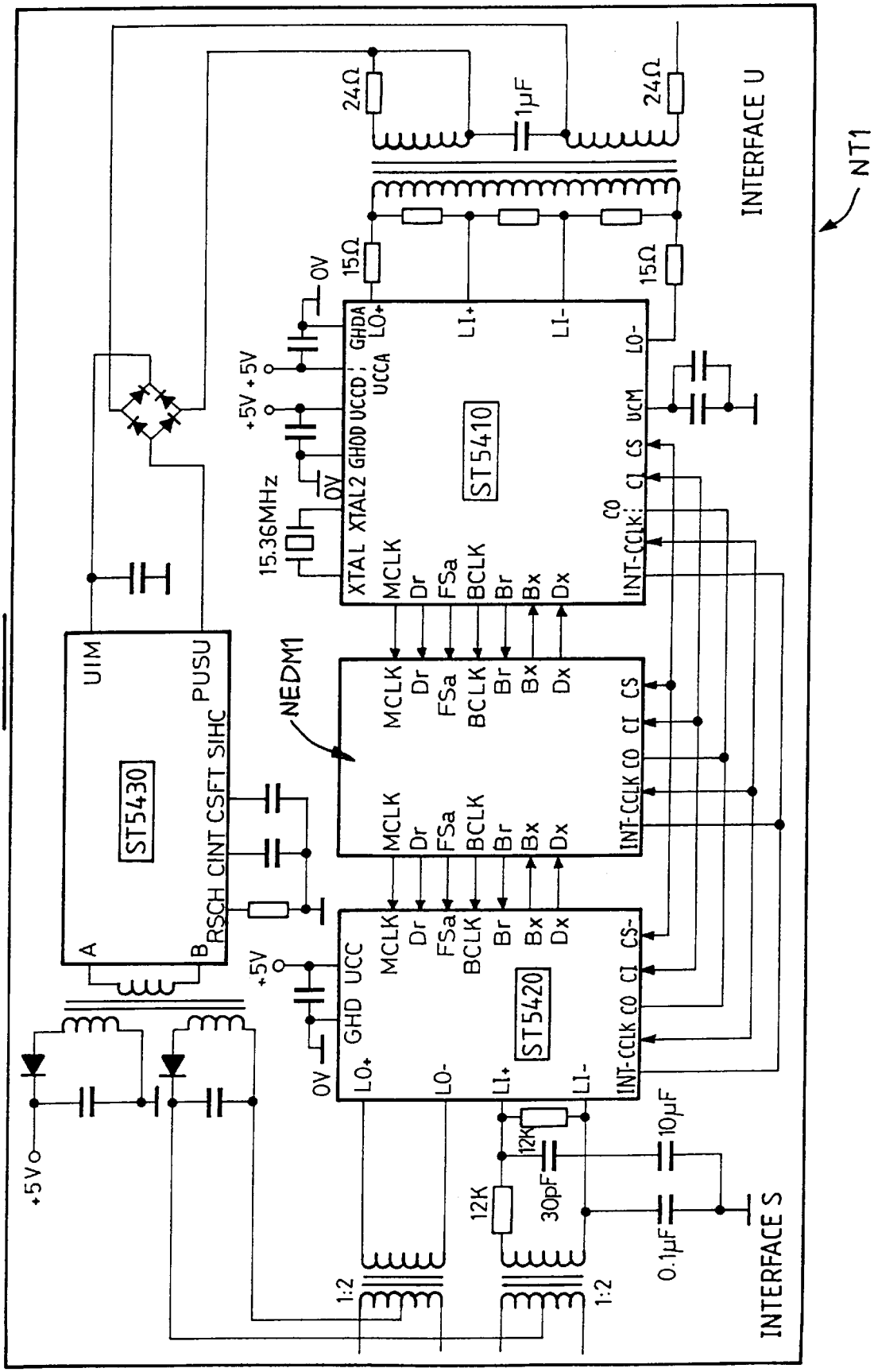
FIG_2

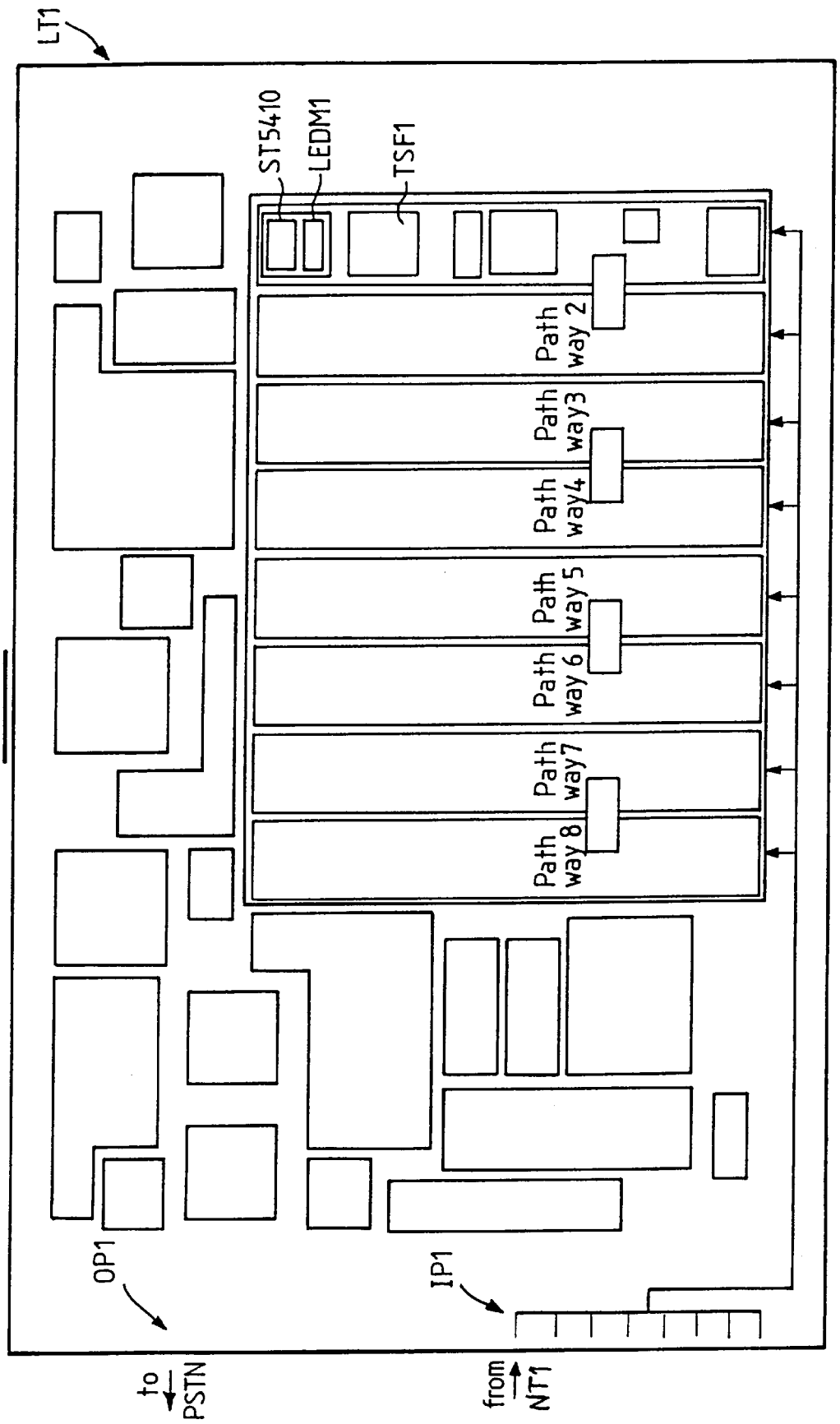

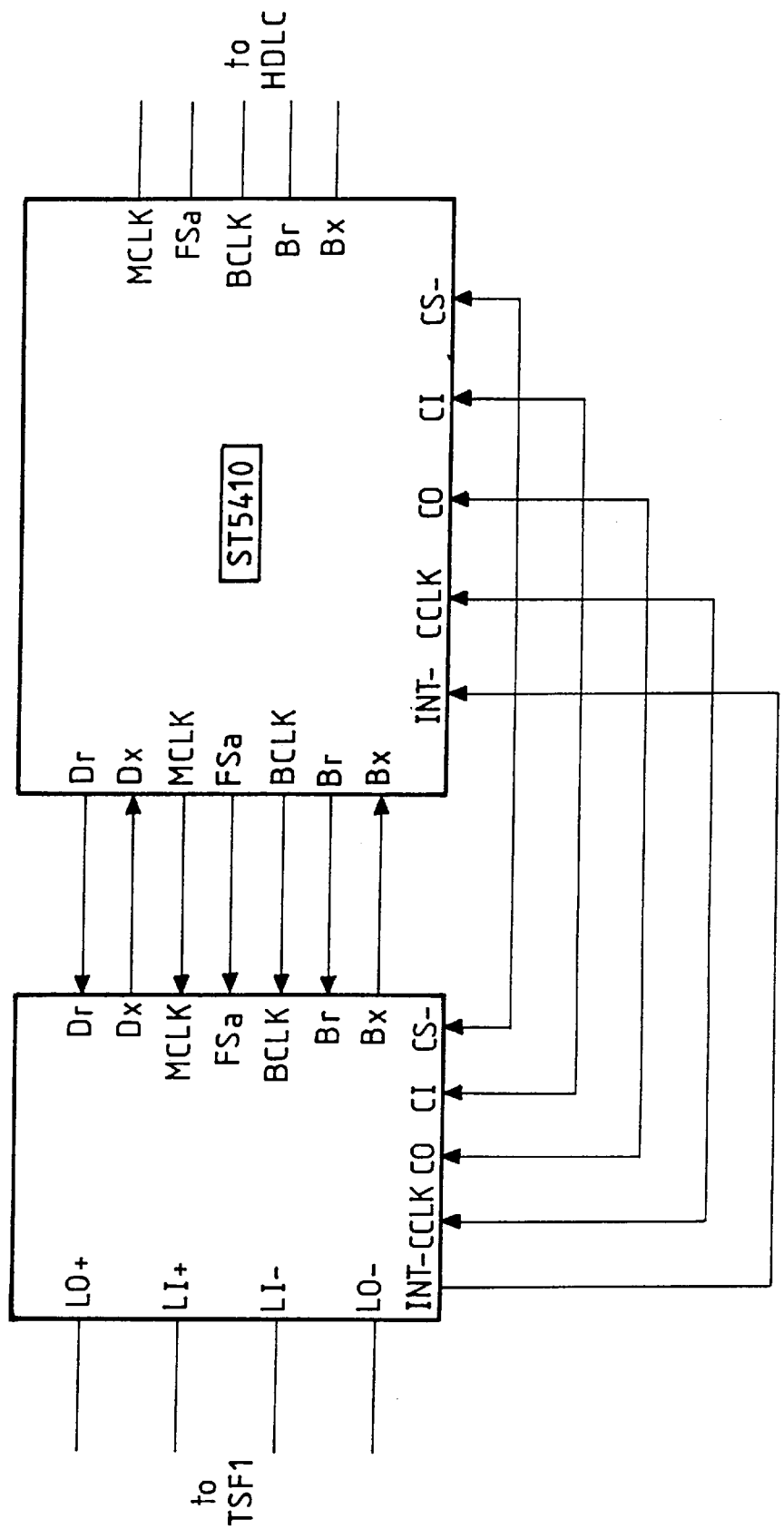

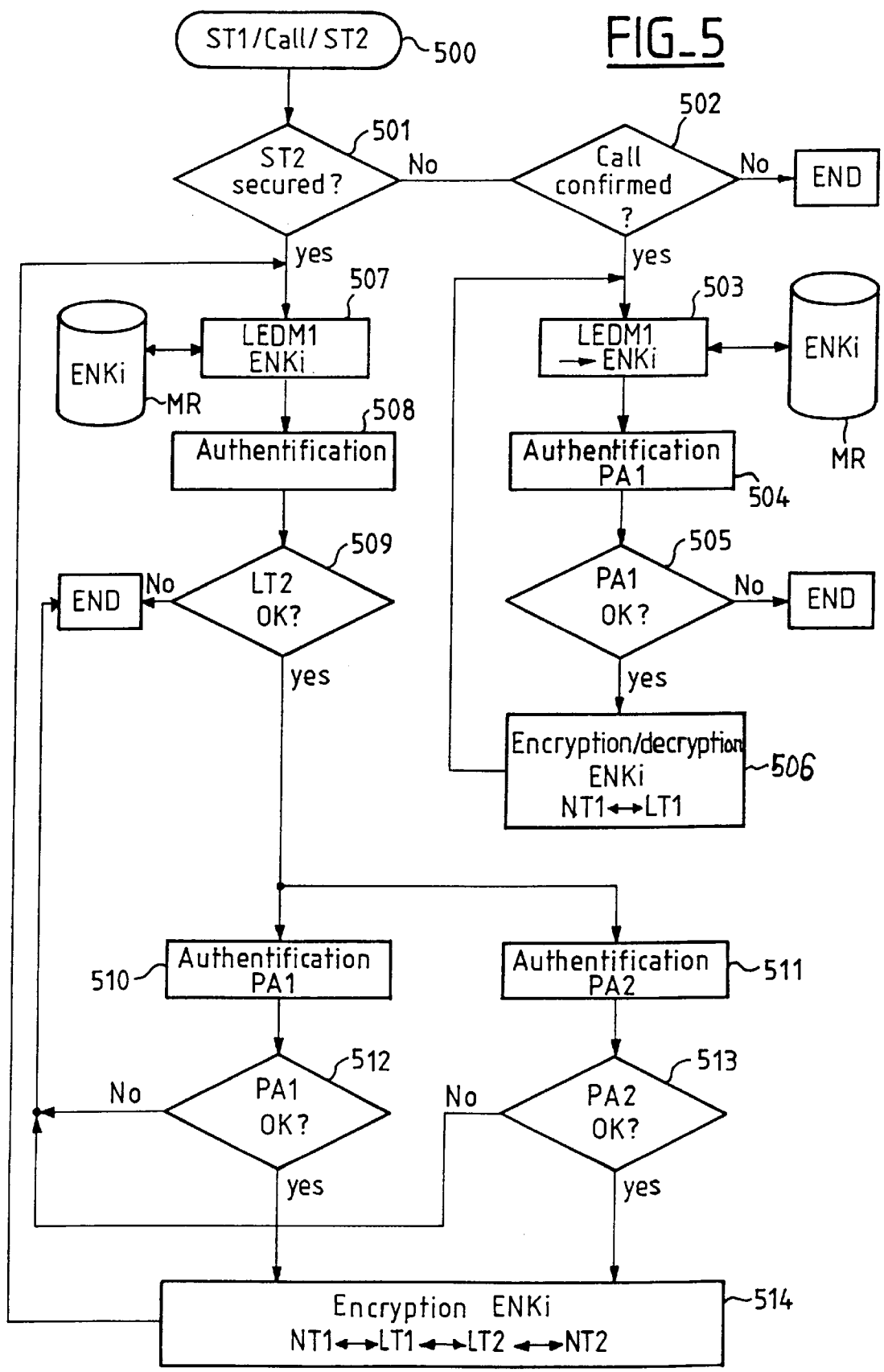

PROCESS AND DEVICE FOR MAKING SECURE A TELEPHONE LINK CONNECTING TWO SUBSCRIBER SETS

FIELD OF THE INVENTION

The invention relates to the making of a secure telephone link connecting two subscriber sets, that is to say especially the protecting of this telephone link against the hijacking of the information exchanged between the two subscriber sets.

BACKGROUND OF THE INVENTION

In hardware terms, a telephone link comprises various items of equipment such as network terminals, line terminals, subscriber lines, local switching centers and the public switched telephone network. More precisely, each subscriber set, for example a telephone set or a modem linked to a computer, is connected, by way of a subscriber tap, to a network terminal, essentially consisting in hardware terms of a specific card, such as for example a so-called TNR card marketed by various companies such as ALCATEL, SAT, SIEMENS or PHILIPS. Each network terminal is linked by a subscriber line to a line terminal located at a local switching center. In hardware terms, the line terminal also includes a specific card, in particular a TABN card marketed by the same companies, and including eight inputs/outputs so as to manage eight subscriber lines. The two local switching centers associated with the telephone link connecting the two relevant subscriber sets are mutually linked by a public switched telephone network.

The transfer and exchange of data and documents carried out by means of these subscriber sets have over the course of this last decade become methods of everyday communication between geographically remote individuals and/or entities. This worldwide electronic communication process has accelerated even more over the course of recent years with the planet-wide development of the Internet network. Through these technologies, without the apparent intervention of an intermediary and almost in real time, the economic world exchanges and transmits information which may exhibit higher or lower degrees of confidentiality.

The commonplace use of these novel forms of communication has highlighted the problem of making secure the exchanges between opposite parties, that is to say between a sender and his intended destination. One of their chief objectives is then to preclude the possibility of the information which they transfer by way of the public switched telephone network being picked up and used without their knowledge by third parties. A solution to this problem could consist in installing encryption/decryption means in the local network of each subscriber, that is to say upstream of the subscriber tap. In this case, the information exchanged between the two subscriber sets is end-to-end encrypted between each encryption/decryption means installed within the subscriber's, local network. Nevertheless, such a solution has numerous drawbacks.

It requires firstly that the encryption/decryption hardware and the corresponding software implemented within this hardware be perfectly mutually compatible. In practice, the hardware and the software will have to be virtually identical. Now, this is difficult to achieve, given the very great disparity which may exist between the various subscribers. Moreover, such a solution requires that a third party organization manage the allocation of the various encryption keys to the subscribers. Furthermore, the communication of the encryption keys between this third party organization and each of the subscribers has likewise to be secure, this constituting a further difficulty.

Finally, in the event that a secured subscriber wishes to contact a non-secured subscriber, the former has to provide means internal to his local network and capable of disconnecting its own encryption/decryption means.

The invention aims to afford a solution to these problems.

SUMMARY OF THE INVENTION

An objective of the invention is to propose a making secure of a telephone link between two subscriber sets which is simple to manage in regard to the encryption keys used, and which leaves the whole of the network transparent and open in the event of a communication exchange between a non-secured subscriber and a secured subscriber.

The objective of the invention is also to propose a system for making secure which adapts without any further constraint, other than those already fixed by the telecommunication operator on the already existing network, whilst ensuring that the data transmitted are made properly secure.

The invention therefore proposes a process for making secure a telephone link connecting two subscriber sets, the said link including two network terminals to which the two subscriber sets are respectively connected, two subscriber lines respectively linking the two network terminals to two line terminals respectively located at two local switching centers mutually linked by a switched telephone network. According to a general characteristic of the invention, the network terminal and line terminal of at least one of the subscriber lines are respectively equipped with network encryption/decryption means and with line encryption/decryption means. The process then comprises an encryption step in which the useful information exchanged between the two subscriber sets is encrypted, at least on those of the two subscriber lines which are connected to the said encryption/decryption means, on the basis of at least one encryption key generated by the said network encryption/decryption means or the said line encryption/decryption means. The said encryption key is also made to vary temporally in pseudorandom fashion on the initiative of the said network encryption/decryption means or of the said line encryption/decryption means, the useful information exchanged between the two calling sets being transmitted in clear at least between each network terminal and the corresponding subscriber set.

In other words, an essential characteristic of the invention resides in the installing in the network terminal and in the line terminal which are associated with at least one of the subscribers, of encryption/decryption means capable of adapting, in real time and autonomously, security protocols on the basis of encryption keys generated autonomously by at least one of these encryption/decryption means, for example the line encryption/decryption means incorporated into the line terminal.

Thus, according to the invention, in the event that only one of the subscribers is secured, and assuming that the latter nevertheless accepts an exchange of information with a non-secured subscriber, the encryption of the information will involve only the portion of the telephone link lying between the network terminal of the secured subscriber and the line terminal located at the local switching center, that is to say especially on the subscriber line which is the easiest part to hijack.

Thus, it has been observed that it was not essential to provide for the encrypting of the information over the switched telephone network, that is to say between the two local switching centers of the two subscriber sets. Thus, the route over this switched telephone network between the two local switching centers is not predetermined and can vary in the course of the exchange of information depending on the congestion of the network.

Moreover, any secured subscriber will be able to receive information from all opposite parties, whether or not they be secured, and will be able to forward information to all their internal and external opposite parties, whether or not they be on secured lines. Thus, if one of the opposite parties is not secured, the line encryption/decryption means installed in the line terminal of the other party, who is himself secured, will decrypt the information exchanged in such a way that it is transmitted in clear over the switched telephone network and then over the subscriber line of the non-secured subscriber.

Moreover, the telecommunication operator is the sole owner of the solutions and technical hardware which he uses to make these subscriber lines secure In practice, he will install identical hardware and identical software in the various local switching centers and in the various network terminals. The problem of the compatibility of the encryption/decryption software used at the various sites of the telephone network is therefore automatically resolved.

Moreover, the fact that the encryption keys are generated automatically by the network terminals and the line terminals renders access to these keys inaccessible to any third party, and even in theory to the operator himself, thus offering a further degree of protection from fraudsters who might attempt to hijack the network. This so, in order to meet certain possible requirements, there may be provision for the operator to be able to have reserved access to the random access memories associated with the various encryption/decryption means so as to be able to ascertain in real time, as the case may be, the encryption key used at the current instant.

Although the invention is applicable to all telephone networks, in particular analog telephone networks on condition that provision is made for analog/digital conversions in respect to the encrypting of the information, the invention applies preferably and advantageously to a digitized telephone network such as the integrated services digital network (ISDN) defined in the ITU-T series I recommendations published by the International Telecommunications Union (formerly the CCITT).

More generally, in a digital telephone link, at least two bidirectional channels, or B channels, are provided for the exchange of information proper between the two subscriber sets, that is to say for example spoken information or computer data or even contents of letters transmitted by fax, as well as a service channel, or D channel, operating in message mode for transporting the signalling and the services in packer mode.

In the case of an application of the invention to a digitized network, all analog/digital conversion is therefore circumvented, thus simplifying the means employed, and the service channel is then advantageously used to transmit the encryption key(s). Thus, it has been observed that it has proved to be very difficult, or even virtually impossible, to be able to intercept and exploit the data travelling over this service channel, especially when these data are themselves made secure by encryption/decryption means such as public key algorithms of the RSA type. Moreover, within the meaning of the present invention and in the case of a digitized network, the useful information intended to be encrypted/decrypted is that conveyed on the B channels.

In the case in which the network and line terminals of the two subscriber lines are respectively equipped with network encryption/decryption means and with line encryption/decryption means, that is to say in the case in which the two subscribers are secured, it is then possible, in the encryption step, to encrypt the useful information exchanged between the two subscriber sets over the whole of the telephone link extending between the two network terminals to which the subscriber sets are respectively connected. This offers a further degree of security.

In a preferred mode of employment of the invention, there is provided, prior to the information encryption step, a step of authenticating the various terminals talking to each other. More precisely, each subscriber set being connected to its corresponding network terminal by a specific input/output port of the said terminal linked to the subscriber tap, each input/output port is assigned an identifier. This identifier may simply be the telephone call number of the subscriber or better a secret code implanted in the network terminal. In the identification step, those of the encryption/decryption means, for example the line encryption/decryption means incorporated into the line terminal, which generated the encryption key, transmit it to the other encryption/decryption means, for example the network encryption/decryption means incorporated in the subscribers' network terminal, and carry out a procedure of verification of the identifier of the relevant input/output port. It is only when this identifier has been verified that the encryption of the useful information exchanged between the two subscriber sets can begin.

It is likewise advantageous to provide for this authentication step to be carried out during the encryption step after each modification of the encryption key.

According to a mode of employment of the process according to the invention, in the encryption step the pseudo-random temporal variation of the encryption key generated by those of the two encryption/decryption means, for example the line encryption/decryption means, comprises the successive temporal generation in pseudo random fashion of several other encryption keys by these same encryption/decryption means. Thus, in other words, and in practice, the line encryption/decryption means incorporated in the line terminal will generate in succession in pseudo-random fashion several encryption keys in the course of the exchange of information. With each new key generated, the coding of the useful information will therefore be modified, temporally in pseud-orandom fashion.

When the two subscribers are secured, the encryption step advantageously comprises the generation of an encryption key by the line encryption/decryption means of one of the two line terminals, then the transmission of this encryption key to the line encryption/decryption means of the other line terminal. The information exchanged between the two subscriber sets are then encrypted/decrypted on the basis of this encryption key. The line encryption/decryption means of the line terminal having generated the encryption key, cause it to vary temporally in pseudo-random fashion and transmit the keys thus modified to the line encryption/decryption means of the other line terminal.

Of course, each line terminal transmits the encryption key, after authentication of the latter, to its associated network terminal. In this regard, it is also possible advantageously to provide a procedure for authentication such as that described above, between the two line terminals.

Generally, when the network is digitized, the identifier verification procedure is advantageously carried out using the service channel.

The subject of the invention is also a device for making secure a telephone line connecting two subscriber sets.

According to a general characteristic of the invention, this device comprises at least network encryption/decryption means and line encryption/decryption means respectively incorporated into the network terminal and line terminal of at least one of the subscriber lines. The said network encryption/decryption means or the said line encryption/decryption means are able to generate at least one encryption key, to cause it to vary temporally in pseudo-random fashion, and to encrypt the useful information exchanged between the two subscriber sets on the basis of the encryption key, doing so at least on those of the two subscriber lines which is connected to the said encryption/decryption means. The information exchanged between the two calling sets is transmitted in clear at least between each network terminal and the corresponding subscriber set.

According to an embodiment of the device, the line encryption/decryption means include means of pseudorandom generation of a plurality of encryption keys.

Other advantages and characteristics of the invention will emerge on examining embodiments and modes of employment, in no way limiting, and the appended drawings.

BRIEF DESCRIPTION OF THE DRAWING

FIG. 1 is a diagrammatic overview of a telephone link between two subscriber sets, FIG. 2 illustrates diagrammatically the internal architecture of a network terminal equipped with encryption/decryption means, FIG. 3 illustrates in diagrammatic manner an electronic card of a line terminal equipped with encryption/decryption means, FIG. 4 illustrates in greater detail a part of the card of FIG. 3, and FIG. 5 is a diagrammatic functional flowchart illustrating the modes of employment of the process according to the invention.

DETAILED DESCRIPTION OF THE INVENTION

An embodiment of the invention using a digitized network will now be described.

In general, a person skilled in the art will be aware that a digital network includes, on a copper telephone pair, two 64-kbit/s bidirectional channels or B channels, switched in circuit mode, and which are used to transport all useful types of information exchanged between the two subscribers, for example a telephone conversation, computer data, etc.

In addition to these two bidirectional B channels, there is also provided a 16 Kbit/s service channel, the so-called D channel, operating in message mode for the transport of signalling and of services in packet mode. Such a structure is in particular that adopted for the so-called "narrow band" integrated services digital network ISDN. Although access at the basic bit rate, described above, and also termed 2B+D, is limited to 144 kbit/s, a so-called "primary" access, or also called 30B+D, is also provided possessing a bit rate of 2048 Kbit/s, and including 30 bidirectional B channels and a D channel exploited in packet mode and supporting the signalling. The so-called primary access makes it possible to develop a wide range of computerized information applications combining voice, data, text and picture.

Although the general structure of a digital telephone network is perfectly known to a person skilled in the art, the latter will nevertheless be able to refer for further details to the ITU-T recommendations of series I, published by the International Telecommunications Union and relating to the various technical and structural aspects, in particular of the integrated services digital network (ISDN).

As illustrated in FIG. 1, the subscriber terminal installation INST1 includes for example a telephone set ST1, a computer CP1 associated with a modem MM1, as well as a fax machine FX1. Together these apparatuses are linked to a subscriber tap PA1 output-linked to a network terminal NT1

The network terminal NT1 is linked by a subscriber line SL1 to a line terminal LT1 incorporated into a local switching center LSC1.

The local switching center LSC1 is linked to the local switching center LSC2 of the other subscriber by way of the public switched telephone network PSTN.

Elements analogous to those just described in respect of the first subscriber are again present as regards the second subscriber, as illustrated at the bottom of FIG. 1.

FIG. 2 illustrates an electronic card according to the invention incorporated into the network terminal NT1 located at the subscribers, installation INST1.

This card has been modified relative to a conventional card of the type known by the reference TNR and marketed for example by the ALCATEL company.

The modification according to the invention consists in introducing, via the internal bus which links the standard interface circuit U and the standard interface circuit S of a card of the regular TNR type, a control and encryption/decryption circuit referenced NEDM1. By way of example, this control and encryption/decryption circuit is geared around a MOTOROLA 68020 microprocessor working at a frequency of 16 MHz and associated with suites of read-only memories of the ROM and EEPROM type, in which are installed encryption/decryption algorithms of the DES type (Data Encryption standard). Of course, the invention is not limited to the use of DES algorithms for the encryption/decryption of the data, but can also use public key algorithms of the RSA type. In addition to the encryption/decryption means, the microprocessor incorporates authentication means making it possible, as will be seen in greater detail hereafter, to carry out before the encryption of the information, verification of the identifier of the called sets and/or terminals. These means are of course embodied in software fashion and incorporated into the read-only memories associated with the microprocessor.

The microprocessor employed encrypts or decrypts in 3500 blocks per second DES mode (a DES block consists of 64 bits). This processing speed is entirely compatible with the transmission speeds of the digital network described here, namely 64 Kbit/s for a B channel. Thus, in DES mode, the encryption/decryption means encrypt or decrypt 1000 blocks a second so as to be compatible with the bit rate of the ISDN network.

More precisely, as may be seen in FIG. 2, the microprocessor NEDM1 and its associated memories is sited between the two conventional circuits ST5410 and ST5420 (marketed by the SGS THOMSON company) of a regular card. The pin layout of the microprocessor is illustrated diagrammatically and partially in FIG. 2 and is such as in particular to receive the D channel input and output signls Dx and Dr, the B channel input and output signals Bx and Br as well as the corresponding clock signals. Modifications which are in all respects symmetric to those described in respect of the card incorporated into the network terminal NT1 are also present with regard to the electronic card incorporated into the line terminal LT1 and illustrated very diagrammatically in FIG. 3.

Generally, this kind of card, such as for example the TABN cards from ALCATEL, or alternatively analog cards marketed by the SAT, PHILIPS or SIEMENS companies include an input port IP1 capable of managing eight different network terminals corresponding to eight different subscribers. The eight inputs of the connector IP1 are respectively linked to eight processing pathways which are linked moreover to the HDLC (High level Data link Control) processing units of the card which receive the data coming from the switched telephone network and which transmit to the latter the data arriving from the cards NT1 which are attached to it. In a conventional manner, diverse logic blocks, memory blocks and also a microprocessor such as for example the 80C186 microprocessor are also provided in addition to the eight pathways represented in this card. Each of the pathways of the card LT1 includes in particular a transformer TSF1 for the standard interface U and a circuit ST5410 analogous to the circuit of the card NT1. The invention therefore here provides for the insertion between the circuit ST5410 and the transformer TSF1 of a microprocessor LEDM1 analogous to the microprocessor NEDM1 incorporated into the network terminal NT1.

Provision may also be made for a single encryption/decryption microprocessor arranged according to a multiplexing/demultiplexing mode capable of working on the eight pathways simultaneously.

Of course, in one and the same card NT1 managing eight subscribers, some of the pathways may not include a microprocessor NEDM1 should the subscriber not wish to avail himself of the security service proposed by the operator.

A mode of operation of the security device according to the invention will now be described in greater detail whilst referring more particularly to FIG. 5.

It is now assumed that in a step 500 the subscriber 1 decides, by way of his telephone set ST1, to call the telephone set of the subscriber 2.

Generally, each subscriber tap possesses an identifier which may for example be the telephone call number of the corresponding subscriber. The operator has a central file and/or local files cataloging the subscribers who have signed up to the security service.

Hence, when the subscriber ST1 calls the subscriber ST2, the microprocessor of the line terminal LT1, for example, can, on knowing the call number of the set ST2, ascertain whether this subscriber is or is not one of the secured subscribers (step 501). It is assumed, initially, that the subscriber having the calling set ST2, is not one of these secured subscribers.

In this case, the microprocessor LEDM1 sends back, by way of the D channel, a cue to the screen, for example, of the calling set ST1, informing the latter that the destination subscriber is not secured. If the subscriber ST1 wishes to interrupt the communication, the exchange comes to an end.

Should he confirm his call (step 502), the process of making secure will begin, and will include encryption of the information only between the network terminal NT1 and the line terminal LT1.

The process according to the invention then commences with a step of mutual authentication of the line terminal LT1 and of the network terminal NT1. More precisely, if it is assumed that the processor LEDM1 incorporated into the terminal LT1 is the master processor and that the processor NEDM1 is the slave (it would have been possible equally to provide for the reverse), the processor LEDM1 will then choose a first encryption key ENKI (step 503) in pseudo-random fashion from a memory MR containing a table of encryption keys ENKi.

From a practical point of view, provision may for example be made for the microprocessor functionally to incorporate a pseudo-random generator which generates, at the microprocessor clock rate, numerical indications representative of the various addresses of the memory MR. When the microprocessor wishes to generate an encryption key, its central unit then reads the current value supplied by the pseudo-random generator and extracts from the memory MR the encryption key contained at the address corresponding to this current value.

This encryption key is then encrypted by the line encryption/decryption means and transmitted over the D channel to the network encryption/decryption means contained in the network terminal NT1 These means, after having decrypted the encryption key, send back, again over the D channel, the identifier of the subscriber tap PA1, coded by means of this encryption key.

The line encryption/decryption means decode this identifier and verify the identity of the network terminal NT1 (step 504).

In case of anomaly (step 505), the security routine comes to an end.

In the contrary case, the useful data exchanged between the two subscriber sets over the B channels are encrypted with the aid of the first chosen encryption key, over the portion of telephone link extending between the network terminal NT1 and the line terminal LT1 (step 506).

After the encryption step, the microprocessor LEDM1 will cause the original encryption key to vary temporally and in pseudo-random fashion. In practice, this pseudo-random temporal variation will be manifested as the successive generation pseudo-randomly over time of several other encryption keys.

Whenever a new encryption key is generated by the processor LEDM1, the latter will institute with the microprocessor NEDM1 of the network terminal an authentication procedure analogous to that described in respect of the first encryption key. So long as this authentication procedure is not successful, encryption continues with the old key. If the authentication procedure does not reveal any anomaly, there is then a switch of key.

In practice, the microprocessor LEDM1 periodically interrogates access to the D channel. Freedom of access on this D channel is in fact random since it depends on the congestion of the latter and on the data which are sent by other elements plugged into the network. It is then particularly advantageous to provide for the microprocessor LEDM1 to extract from the memory MR the encryption key ENKi stored at the address delivered by the pseudo-random generator whenever access to the D channel is free. A temporal pseudo-random variation of the encryption key is thus effected in a very simple manner.

Should the D channel not be very busy, it is possible advantageously to provide a program for managing the clock frequency internal to the microprocessor. For example, this program pseudo-randomly triggers, during a working cycle or fraction of a working cycle of the microprocessor, the command to extract a new key ENKi. If the D channel is free, it sends it immediately, otherwise the key is stored in memory and dispatched as soon as the channel is free.

of course, during each phase of encryption with the aid of a particular encryption key, the latter is stored in a work memory of the microprocessor. In order to meet certain predetermined requirements, it is then possible to provide for the operator of the network to enjoy reserved access to this work memory in order, as the case may be, to be able to ascertain in real time the encryption key used and possibly to decrypt the information travelling over the subscriber line.

Of course, the information travelling between the local switching center LSC1 and the subscriber set ST2 is decrypted by the encryption means LEDM1 and therefore travels in clear over this part of the telephone link.

It is now assumed that the telephone set ST2 belongs to a secured subscriber.

In this case, the network terminal NT2 and line terminal LT2 of this second subscriber are likewise equipped with encryption/decryption means which are the counterparts of those just described.

In a step 507, one of the line terminals, in this instance the terminal LT1, is declared master, whilst the other line terminal LT2 is the slave. The corresponding processor LEDM1 then chooses in a manner analogous to that described earlier, an encryption key ENKi from the memory MR and institutes (step 508) an authentication procedure with the line terminal LT2. This authentication procedure is analogous to that described earlier.

If this authentication procedure turns out correct (step 509), each of the line terminals institutes with its associated network terminal an authentication procedure analogous to that described earlier (steps 510 and 511).

Should these two authentication procedures turn out correct (steps 512 and 513), the encryption of the information exchanged over the B channel is carried out with the aid of the encryption key chosen by the microprocessor LEDM1, namely between the network terminal NT1 and the network terminal NT2.

The temporal pseudo-random variation of the encryption key is likewise carried out during the encryption step on the initiative of the microprocessor LEDM1 in the same way as that described earlier, and likewise gives rise to new authentication procedures.

Of course, throughout what has just been described, any conflicts in calls between terminals are settled for example through a method of access of the CSMA/CR (Carrier Sense Multiple Access/Collision Resolution) type, well known to the person skilled in the art.

I claim:

1. Process for making a secure telephone link connecting first and second subscriber sets, said telephone link including first and second network terminals to which the first and second subscriber sets are respectively connected, and first and second subscriber lines respectively linking the first and second network terminals to first and second line terminals respectively located at first and second local switching centers mutually linked by a switched telephone network, characterized in that, the network terminal and the line terminal of at least one of the subscriber lines being respectively equipped with network encryption/decryption means and with line encryption/decryption means, wherein the process comprises an encryption step in which information exchanged between the first and second subscriber sets is encrypted, at least on one of the two subscribe lines which is connected to the said respective network and line encryption/decryption means, on the basis of at least one encryption key generated by said network encryption/decryption means or by said line encryption/decryption means, and varying temporally in pseudo-random fashion by said network encryption/decryption means or by said line encryption/decryption means, the information exchanged between the two subscriber sets being transmitted in clear at least between each network terminal and the corresponding subscriber set.

2. Process according to claim 1, characterized in that, each subscriber set being connected to the corresponding network terminal by a specific input/output port of the said corresponding network terminal, each input/output port is assigned an identifier, and in that said process comprises, prior to the encryption step, an authentication step in which at least one of the encryption/decryption means which generated the encryption key transmits said encryption key to another encryption/decryption means for carrying out a procedure of verification of the identifier of the relevant input/output port.

3. Process according to claim 2, characterized in that said authentication step is carried out during said encryption step after each modification of the encryption key.

4. Process according to claim 2, characterized in that the telephone link being a digital link including at east two bidirectional channels for exchanging information between the two subscriber sets, and a service channel, the encryption keys being transmitted over the service channel.

5. Process according to claim 4, characterized in that the encryption/decryption means generating the encryption keys periodically poll an access to the service channel and generate a new encryption key when said access to the service channel is available.

6. Process according to claim 4, characterized in that the identifier verification procedure is carried out using the service channel.

7. Process according to claim 1, characterized in that in the encryption step the pseudo-random temporal variation of the encryption key generated by those of the two encryption/decryption means comprises the successive temporal generation in pseudo-random fashion of several other encryption keys by these same encryption/decryption means.

8. Process according to claim 1, characterized in that the network terminals and line terminals of the first and second subscriber lines being respectively equipped with network encryption/decryption means and with line encryption/decryption means, the information exchanged between the first and second subscriber sets over the whole telephone link extending between the first and second network terminals to which the subscriber sets are respectively connected is encrypted in the encryption step.

9. Process according to claim 8, characterized in that the encryption step comprises the generation of an encryption key by the line encryption/decryption means of one of the two line terminals, then the transmission of this encryption key to the line encryption/decryption means of the other line terminal, the information exchanged between the two subscriber sets being encrypted/decrypted on the basis of this encryption key, and in that the line encryption/decryption means of the line terminal having generated the said encryption key causes said encryption key to vary temporally in pseudo-random fashion and transmits encryption keys thus modified to the line encryption/decryption means of the other line terminal.

10. Device for making a secure telephone link connecting first and second subscriber sets, the said telephone link including first and second network terminals to which the first and second subscriber sets are respectively connected, first and second subscriber lines respectively linking the first and second network terminals to first and second line terminals which respectively located at first and second local switching centers mutually linked by a switched telephone network, characterized in that the device comprises at least one network encryption/decryption means and one line encryption/decryption means respectively incorporated into the network terminal and line terminal of at least one of the subscriber lines, said network encryption/decryption means and said line encryption/decryption means generating at least one encryption key, causing the encryption key to vary temporally in pseudo-random fashion, and encrypting information exchanged between the two subscriber sets on the basis of the encryption key, at least on one of the two subscriber lines which is connected to the respective network and line encryption/decryption means, the information exchanged between the two subscriber sets being transmitted in clear at least between each network terminal and the corresponding subscriber set.

11. Device according to claim 10, characterized in that the line encryption/decryption means include means of pseudo-random generation of a plurality of encryption keys.

12. Device according to claim 10, characterized in that the two network terminals and the two line terminals each respectively comprise one encryption/decryption means.

* * * * *